(12) United States Patent
Ronchini Ximenes et al.

(10) Patent No.: US 11,215,712 B2
(45) Date of Patent: Jan. 4, 2022

(54) TIME-TO-DIGITAL CONVERTER FOR DEPTH SENSING

(71) Applicant: Facebook Technologies, LLC, Menlo Park, CA (US)

(72) Inventors: Augusto Ronchini Ximenes, Seattle, CA (US); Michael Hall, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 65 days.

(21) Appl. No.: 16/859,487

(22) Filed: Apr. 27, 2020

(65) Prior Publication Data

US 2021/0333402 A1  Oct. 28, 2021

(51) Int. Cl.
*G01S 17/00* (2020.01)
*G01S 17/894* (2020.01)
*G01S 7/4865* (2020.01)
*G06T 7/80* (2017.01)
*G06T 7/521* (2017.01)

(52) U.S. Cl.
CPC .......... *G01S 17/894* (2020.01); *G01S 7/4865* (2013.01); *G06T 7/521* (2017.01); *G06T 7/80* (2017.01)

(58) Field of Classification Search
CPC .............. G06T 7/00; G01S 7/00; G01S 17/00
See application file for complete search history.

(56) References Cited

U.S. PATENT DOCUMENTS

2019/0291743 A1\* 9/2019 Druml ................... G01S 7/4073
2020/0319344 A1\* 10/2020 Ronchini Ximenes ......................
                                                    G01S 7/4865

\* cited by examiner

*Primary Examiner* — Maryam A Nasri
(74) *Attorney, Agent, or Firm* — Fenwick & West LLP

(57) ABSTRACT

A depth camera assembly is used to obtain depth information describing a local area. The depth camera assembly includes a sensor having a plurality of pixels. Some or all of the pixels are divided into groups that are coupled to respective multi-purpose time-to-digital converters. Each multi-purpose time-to-digital converter comprises an oscillator and a counter. Each pixel in a group is associated with a multiplexer that is configured to select between inputs coupled to the pixel, the oscillator, or a counter associated with a different pixel. The multiplexer outputs the signal to the counter for the time-to-digital converter associated with the pixel. A time-of-flight measurement is taken during a first portion of an image frame. During a second portion of the image frame, the sensor may be used as an intensity counter. During a third portion of the image frame, the depth sensor may be calibrated.

20 Claims, 11 Drawing Sheets

900

Estimate, during a first subframe of a depth frame, raw depth values associated with light collected by each pixel of a first group of pixels in a sensor for a depth camera assembly
910

Perform, during a second portion of the image frame, an intensity measurement for one or more pixels in the first group of pixels, wherein each intensity measurement is based in part on information received from the plurality of counters
920

Calibrate, during a third portion of the image frame, one or more TDCs of the sensor
930

Calibrate the raw depth values for the image frame using the intensity measurements
940

FIG. 9

TIME-TO-DIGITAL CONVERTER FOR DEPTH SENSING

FIELD OF THE INVENTION

This disclosure relates generally to artificial reality systems, and more specifically to depth sensing artificial reality systems.

BACKGROUND

Depth sensing systems determine depth information describing a local area. Depth sensing systems often include a light projector that illuminates a portion of a local area with light. The light may be, e.g., infrared (IR) light for time-of-flight (TOF) measurements. One or more depth sensors detects reflected light from objects in the portion of the local area that include the light from the light projector, and a controller computes depth information for the portion of the local area using the detected light. The depth acquisition time may be shorter than an image framerate. Thus, pixels on a depth sensor may be unused for portions of each frame.

SUMMARY

A depth camera assembly is used to obtain depth information describing a local area. The depth camera assembly includes a sensor having a plurality of pixels. Some or all of the pixels are divided into groups that are coupled to respective multi-purpose time-to-digital converters (TDC). Each multi-purpose (TDC) comprises an oscillator and a counter. Each pixel in a group is associated with a multiplexer that is configured to select between inputs from the pixel, the oscillator, or a counter associated with a different pixel. The multiplexer outputs the signal to the counter for the (TDC) associated with the pixel. A TOF measurement is taken during a first portion of an image frame. During a second portion of the image frame, the sensor may be used as an intensity counter. During a third portion of the frame, the depth sensor may be calibrated.

A depth camera assembly (DCA) comprises a sensor comprising a plurality of pixels configured to capture images of a local area. The plurality of pixels comprises a group of pixels. The DCA comprises a plurality of counters that are coupled to each other, wherein each of the plurality of counters is coupled to a corresponding pixel of the group of pixels. The DCA comprises a controller configured to estimate, during a first portion of an image frame, raw depth values associated with light collected by each pixel of the group of pixels. The controller is configured to perform, during a second portion of the image frame, an intensity measurement for a first pixel in the group of pixels. The intensity measurement may be based in part on information received from the plurality of counters during the second portion of the image frame.

A method may comprise estimating, during a first portion of an image frame for a DCA comprising a sensor, raw depth values associated with light collected by each pixel of a group of pixels on the sensor. The method may comprise performing, during a second portion of the image frame, an intensity measurement for a first pixel in the group of pixels. The intensity measurement may be based in part on information received from a plurality of counters during the second portion of the image frame. Each of the plurality of counters may be coupled to a corresponding pixel of the group of pixels.

A DCA may comprise a first pixel and a first time-to-digital converter coupled to the first pixel. The first time-to-digital converter comprises a first oscillator and a first counter. The DCA may comprise a first multiplexer comprising a multiplexer input coupled to the first pixel, a multiplexer input coupled to the first oscillator, and a multiplexer output coupled to the first counter. The DCA may comprise a second pixel and a second time-to-digital converter coupled to the second pixel. The second time-to-digital converter comprises a second oscillator and a second counter. The DCA may comprise a second multiplexer comprising a multiplexer input coupled to the second pixel, a multiplexer input coupled to the second oscillator, a multiplexer input coupled to the first counter, and a multiplexer output coupled to the second counter.

BRIEF DESCRIPTION OF THE DRAWINGS

FIG. 9 is a flowchart illustrating a process for calibrating a sensor, in accordance with one or more embodiments.

Figure 1A:
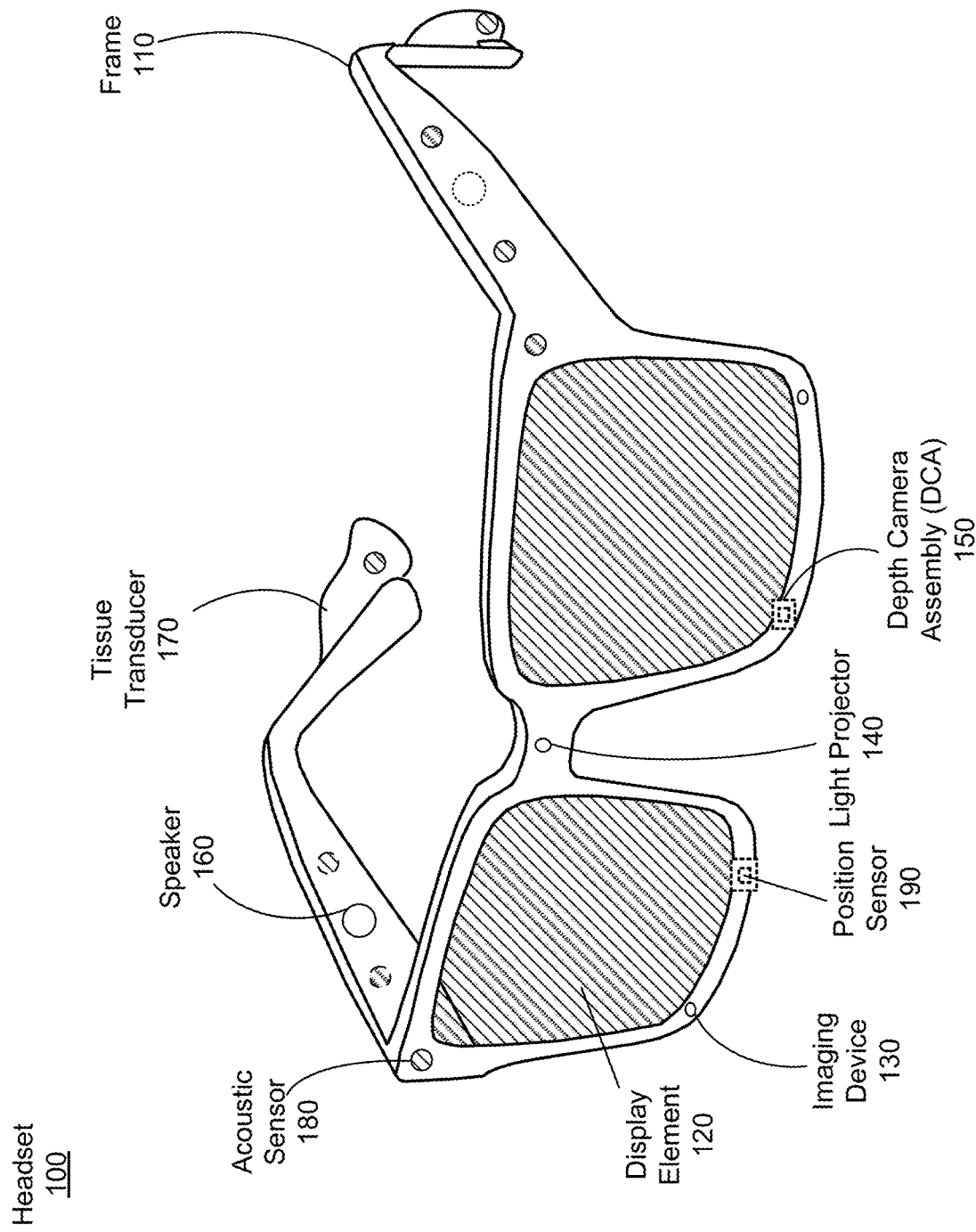
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A headset includes a depth camera assembly used to obtain depth information describing a local area. The depth camera assembly includes a sensor having a plurality of pixels. Some or all of the pixels are divided into groups that are coupled to respective multi-purpose time-to-digital converters. Each multi-purpose time-to-digital converter comprises an oscillator and a counter. Each pixel in a group is associated with a multiplexer that is configured to select between inputs from the pixel, the oscillator, or a counter associated with a different pixel. The multiplexer outputs the signal to the counter for the time-to-digital converter (TDC) associated with the pixel. A time-of-flight (TOF) measurement is taken during a first portion of an image frame. In order to prevent motion blur, the duration of the TOF measurement may be significantly less than an image framerate. Thus, the sensor components are available for other functions during the remainder of the image frame. During a second portion of the image frame, the sensor may be used as an intensity counter. During a third portion of the frame, the depth sensor may be calibrated.

Multiple TDC counters are combined to obtain intensity counts for each of the pixels in a group, sequentially. The native resolution of the sensor may be extracted with wide dynamic range by using the combined counters to measure the intensity of the pixels in the group at different times. For example, in an embodiment with four pixels in a group each having a five bit counter, a twenty bit intensity counter at native resolution may be obtained during the conventionally idle time of an image frame for a depth sensor by electronically rearranging the counters during the image frame. The TOF measurements, intensity measurements, and TOF calibration may be performed in any order during the image frame.

The intensity values may be obtained during portions of an image frame in which conventional systems leave the pixels idle. The intensity values may be used to estimate ambient light without projecting light into the local area, target reflectivity when projecting light into the local area, etc. The sensor may be used for both depth and intensity information, which may reduce errors caused by alignment issues when separate intensity and depth sensors in different locations are used.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA) 150, an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, earpiece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In some embodiments, the local area may include the user's face, such as the eyes of the user. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA 150 determines depth information for a portion of a local area surrounding the headset 100. The DCA includes one or more imaging devices 130 and a DCA controller (not shown in FIG. 1A) and may also include a light projector 140. In some embodiments, the light projector 140 illuminates a portion of the local area with light. The light may be, e.g., structured light (e.g., dot pattern, bars, etc.) in the infrared (IR), IR light for time-of-flight, etc. In some embodiments, the one or more imaging devices 130 capture images of the portion of the local area that include the light from the light projector 140. As illustrated, FIG. 1A shows a single light projector 140 and two imaging devices 130. The DCA 150 comprises a sensor including groups of pixels. Each group of pixels comprises a multi-purpose time-to-digital converter (TDC) associated with each pixel in the group.

The DCA controller computes depth information for the portion of the local area using the captured images and one or more depth determination techniques. The depth determination technique may be, e.g., direct time-of-flight (TOF) depth sensing or indirect TOF depth sensing. In some embodiments, the DCA controller may obtain depth information using additional techniques, such as structured light, passive stereo analysis, active stereo analysis (uses texture added to the scene by light from the light projector 140), some other technique to determine depth of a scene, or some combination thereof.

The DCA 150 is configured to obtain both TOF and intensity information during a single image frame. During a first portion of an image frame, the DCA 150 is configured to obtain TOF information. During a second portion of the image frame, the DCA 150 is configured to obtain intensity information. During a third portion of the image frame, the DCA 150 is configured to calibrate the sensor. The TOF measurements, intensity measurements, and TOF calibration may be performed in any order during the image frame. Operation and structure of the DCA 150 is further described with respect to FIG. 2.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. The eye tracking unit may obtain depth information describing the eye location using TOF measurements. The eye tracking unit may obtain both TOF and intensity information during a single image frame. In some embodiments, the eye tracking unit may illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller processes information from the sensor array that describes sounds detected by the sensor array. The audio controller may comprise a processor and a computer-readable storage medium. The audio controller may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 10.

Figure 1B:
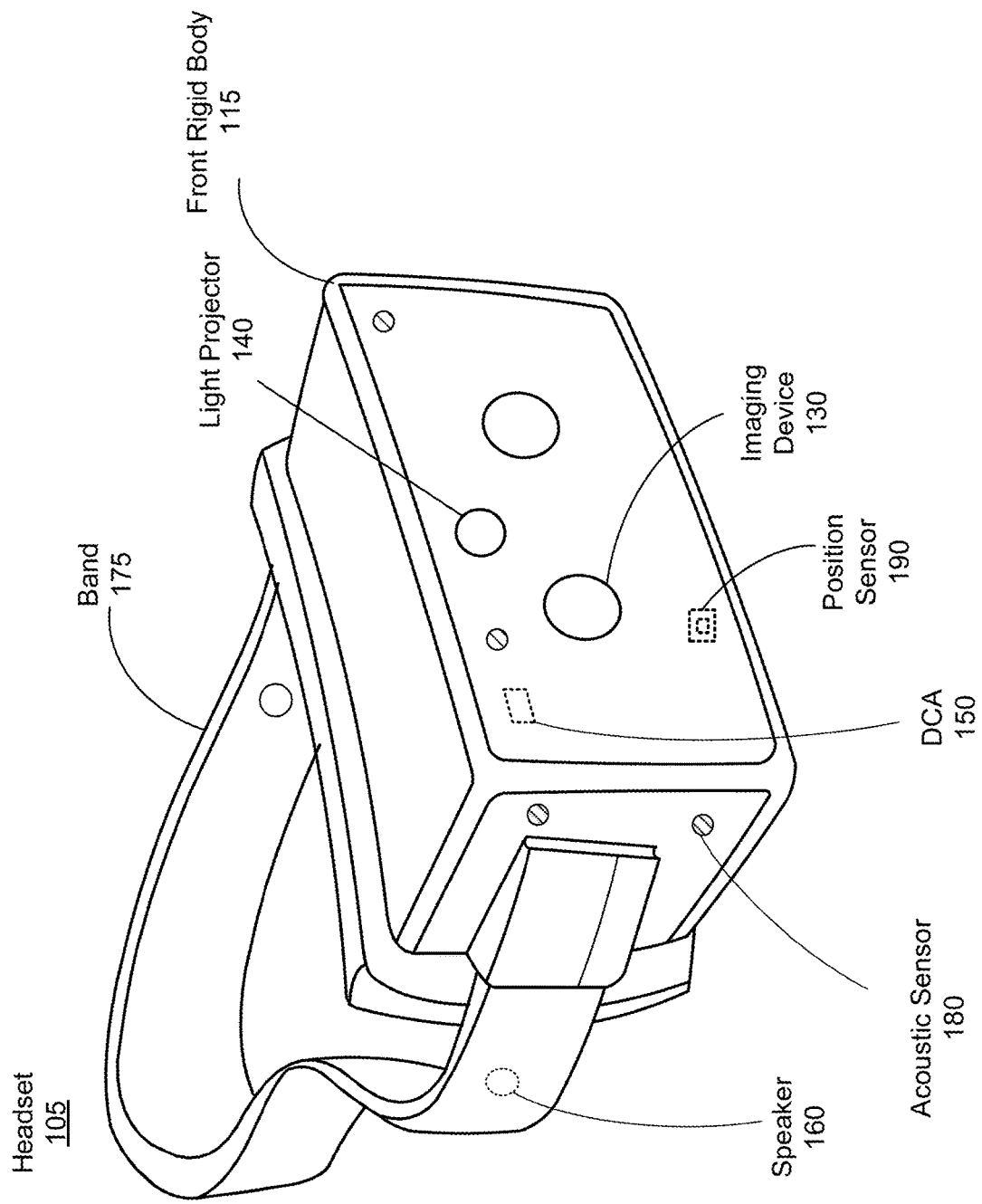
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA 150, an audio system, and a position sensor 190. FIG. 1B shows the light projector 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
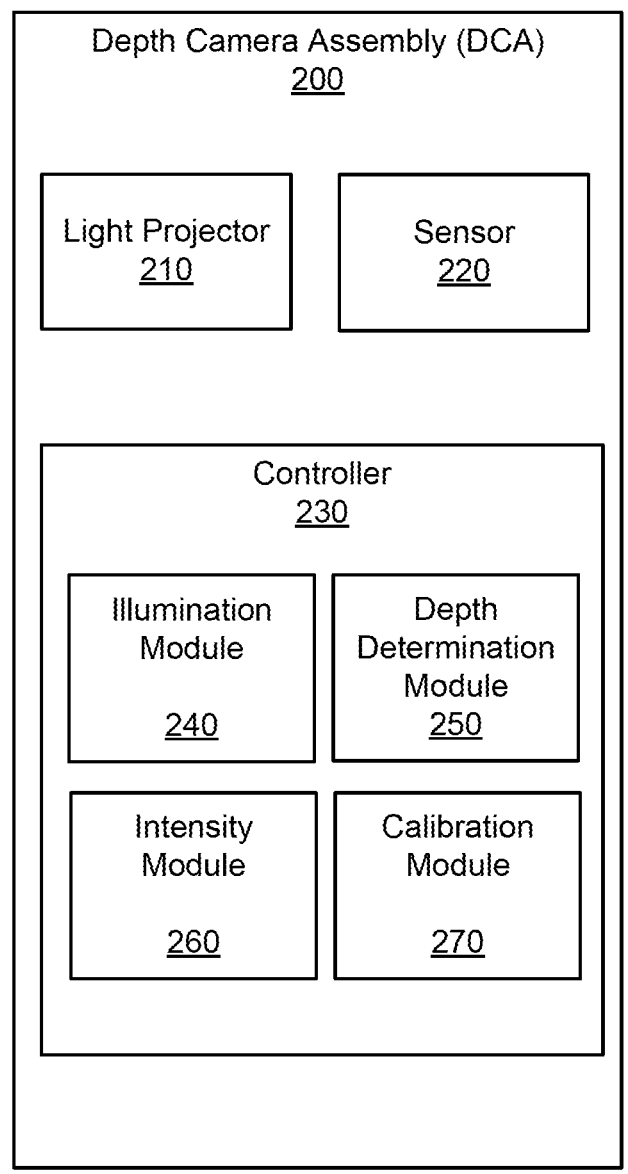
FIG. 2 is a block diagram of a depth camera assembly, in accordance with one or more embodiments.

FIG. 2 is a block diagram of a DCA 200 in accordance with one or more embodiments. The depth camera assembly 150 of FIG. 1A and FIG. 1B may be an embodiment of the depth camera assembly 200. The depth camera assembly 200 is configured to obtain depth information of a local area surrounding the depth camera assembly 200. For example, the depth camera assembly 200 may be configured to detect the location of objects in a room. In embodiments involving eye-tracking, the local area may include the eyes of a user of a headset.

The depth camera assembly 200 comprises a light projector 210 configured to project light into the local area. The light projector 140 of FIG. 1A and FIG. 1B may be an embodiment of the light projector 210. The light may be, e.g., structured light (e.g., dot pattern, bars, etc.) in the infrared (IR), IR light for time-of-flight, etc. The projected light reflects off objects in the local area, and a portion of the reflected light is detected by the depth camera assembly 200.

The depth camera assembly 200 comprises a sensor 220 configured to detect light. In some embodiments, the sensor 220 may comprise a charge-coupled device (CCD) or a complementary metal-oxide-semiconductor (CMOS). The sensor 220 comprises a plurality of pixels. Each pixel is configured to detect photons incident on the pixel. The pixels are configured to detect a narrow bandwidth of light including the wavelength of the projected light. Each pixel may correspond to a distinct direction relative to the sensor 220.

The sensor 220 is configured to obtain different types of information during different portions of an image frame. The image frame may be divided into N subframes. During a TOF subframe of the image frame, the sensor 220 is configured to obtain TOF measurements. During one or more intensity subframes, the sensor 220 is configured to obtain intensity measurements. The image frame may comprise N−2 intensity subframes. During a TOF calibration subframe, the sensor 220 is configured to calibrate the sensor 220.

The pixels of the sensor 220 are arranged in groups configured to obtain both depth information and intensity information. A group comprises multiple pixels, such as four, eight, or any other suitable number of pixels. For an image frame having N subframes, the group of pixels may comprise N−2 pixels. The pixels in a group may be adjacent pixels (i.e. no pixel is located between two adjacent pixels) in a single row, a single column, arranged in a square or rectangle, or some combination thereof. In some embodiments, the pixels in a group may not be adjacent to each other and may be located at any suitable positions on the sensor 220.

Each pixel in a group is coupled to a respective time-to-digital converter configured to record time-of-flight measurements during a TOF subframe. The time-to-digital converter may comprise an oscillator and a counter. The oscillator is coupled to the counter via a multiplexer. The counter may be a ripple counter (also referred to as an asynchronous counter). The counter may comprise four bits, five bits, or any other suitable number of bits. The number of pixels in a group may depend on a desired dynamic range. In one embodiment where twenty bits are desired for the counters of a group of pixels and each counter comprises five bits, the group may be selected to have four pixels. In groups having greater numbers of pixels, image frames may be divided into greater numbers of phases in order to achieve native resolution.

In some embodiments, the DCA may use a start-stop scheme to calculate distance. In the start-stop scheme, the DCA may comprise a clock that sends a signal to the time-to-digital converter at the same time that a pulse is emitted by the light projector 210. The oscillator is configured to increment the counter until one or more pulses are received from the pixel which indicate detection of photons emitted by the light projector 210 and reflected by an object in the local area. The distance to the object may be calculated based on the measured time between the pulse emitted by the light projector 210 and the detection of the photons by the pixel.

In some embodiments, the DCA may use a reverse start-stop scheme to calculate distance. In the reverse start-stop scheme, in response to the pixel detecting a photon, the pixel transmits a signal that starts the oscillator. The oscillator is configured to increment the counter until a signal from the clock stops the counter. The clock signal is delayed from the emission of the laser pulse by a total measurement range. The delay may be twice the maximum measurable distance divided by the speed of light. The counter value may be used to calculate the distance to the object which reflected the detected photon.

During an intensity subframe for a first pixel in a group of pixels, the first pixel is configured to transmit signals to the counter. In response to a single photon detection by the first pixel, the first pixel is configured to transmit a pulse that increments the counter. The counters for each pixel in the group are coupled together via the multiplexers to form a combined counter including the bits from each individual counter. For example, for four five bit counters, the combined counter comprises twenty bits. Thus, each pulse from the pixel increments the combined counter. During an intensity subframe for a second pixel in the group of pixels, the counters are reconfigured to form a combined counter for the second pixel, and each pulse transmitted by the second pixel increments the combined counter for the second pixel. The intensity of each pixel in the group may be measured during a respective intensity subframe for each pixel.

Each pixel in the group is coupled to a multiplexer configured to select between multiple inputs. The multiplexer may comprise a first input from the oscillator, a second input from the pixel, and a third input from a counter for a different pixel in the group of pixels. An output of the multiplexer is coupled to the counter. During a TOF subframe, the multiplexer is configured to select the input from the oscillator. During a TOF calibration subframe, the multiplexer is configured to select the input from the oscillator, as in regular TOF operation. An external signal is used to start and stop the TDC using a calibrated pulse width for calibration. During an intensity subframe for a first pixel in the group of pixels, the multiplexer is configured to select the input from the first pixel. During intensity subframes for other pixels in the group of pixels, the multiplexer for the first pixel is configured to select the multiplexer input coupled to the counter for a different pixel in the group of pixels.

The controller 230 is configured to provide instructions to the various components of the DCA 200 and calculate depth information for the local area using one or more depth determination techniques. The depth determination technique may be, e.g., direct TOF depth sensing or indirect TOF depth sensing. In some embodiments, the controller 230 may calculate depth information using structured light, passive stereo analysis, active stereo analysis (uses texture added to the scene by light from the light projector 140), some other technique to determine depth of a scene, or some combination thereof.

The controller 230 is configured to calculate depth information at a depth frame rate. The depth frame rate may be specified by the controller 230 or by other components of a system including the controller 230. In some embodiments, the depth frame rate may be between 30-50 frames per second (fps), between 1-100 fps, or any other suitable frame rate. Each depth frame has a frame length. For example, a depth frame for a 30 fps depth frame rate has a frame length of 33 milliseconds (ms). However, the controller 230 may obtain depth information during a portion of each depth frame which is less than the total frame length. For example, for a 33 ms depth frame, the controller 230 may obtain depth information during a 5 ms TOF subframe. The controller 230 divides each depth frame into multiple subframes. For example, the controller 230 may divide a depth frame into a TOF subframe during which the controller 230 obtains depth information, one or more intensity subframes during which the controller 230 obtains intensity information, and a calibration subframe during which the controller 230 calibrates the sensor 220.

The controller 230 comprises an illumination module 240 configured to provide instructions to the light projector 210. The illumination module 240 is configured to instruct the light projector 210 to emit light into the local area. During the TOF subframe, the illumination module 240 may instruct the light projector 210 to emit light pulses. The light pulses may comprise IR light illuminating the field of view of the light projector 210, a structured light pattern, or some combination thereof. The light pulses may be in a narrow bandwidth which the sensor 220 is configured to detect. For example, the light pulses may be infrared light with a full width at half maximum of less than 10 nm, or less than 1 nm. During the intensity subframes, the illumination module 240 may instruct the light projector 210 to emit pulsed light, steady light, or to be inactive. For example, the light projector 210 may be inactive to obtain ambient radiation intensities, or the light projector 210 may project light to calibrate for object reflectivity. During the calibration subframe, the illumination module 240 may instruct the light projector 210 to be inactive.

The controller 230 comprises a depth determination module 250. The depth determination module 250 is configured to provide instructions to the sensor 220 to obtain depth information. The depth determination module 250 is configured to calculate depth information based on the information obtained by the sensor 220. During the TOF subframe, the depth determination module 250 instructs the sensor 220 to activate the oscillator input to the multiplexer for each pixel of the sensor 220. The depth determination module 250 obtains the time duration between pulse emissions by the illumination module 240 and photon detection by each pixel and calculates depth information for each pixel. The depth determination module 250 may operate in a start-stop scheme or a reverse start-stop scheme. The time duration may be calculated by combining the oscillator phase information with the counter value. In some embodiments, the depth determination module 250 may obtain depth information based on detecting distortions in a structured light pattern. The controller 230 may generate a depth map of the local area based on the depth information for each pixel.

The controller 230 comprises an intensity module 260 configured to obtain intensity information for one or more pixels in each group of pixels on the sensor 220. In some embodiments, the intensity module 260 may obtain intensity information for all pixels in each group of pixels. During a first intensity subframe, the intensity module 260 instructs the sensor 220 to activate the pixel input for the multiplexer for a first pixel in a group of pixels, and to activate the counter inputs to the multiplexers for the other pixels in the group of pixels. In response to a single photon detection, the first pixel transmits a signal via its multiplexer which increments its counter. The output of the counter for the first pixel is coupled to the counter input for the multiplexer for a second pixel in the group of pixels. In response to the counter for the first pixel reaching its maximum count, the counter outputs a signal which increments the counter for a second pixel in the group of pixels. For example, for a five bit counter, the counter may be capable of counting from 0-31. In response to a thirty-second count, the counter may increment the counter for the second pixel (e.g., from 0 to 1) and reset the count of the first pixel to 0. Similarly, the output of the counter for the second pixel is coupled to the counter input for the multiplexer for a third group of pixels. Thus, the bits of the first counter may represent the least significant bits for a complete count, and each subsequent counter in the group of pixels may represent the next greater significant bits. By coupling the counters from multiple pixels together, a greater number of bits may be used to count events on a single pixel. For example, in a group of four pixels which each are coupled to a five bit counter, the intensity value for a pixel may be counted using twenty bits. The intensity module 260 reads the value from all the utilized counters to obtain the intensity value of the pixel. Thus, the pixel may be exposed for a greater length of time without reaching saturation, which may allow for more accurate intensity readings.

During a second intensity subframe, the intensity module 260 may instruct the sensor 220 to activate the pixel input for the multiplexer for the second pixel in the group of pixels, and to activate the counter inputs to the multiplexers for the other pixels in the group of pixels. Similarly, during a third intensity subframe, the intensity module 260 may instruct the sensor 220 to activate the pixel input for the multiplexer for a third pixel in a group of pixels, and to activate the counter inputs to the multiplexers for the other pixels in the group of pixels. For each pixel in the group of pixels, the intensity module 260 may instruct the sensor 220 to obtain an intensity value for the pixel during a different intensity subframe. In some embodiments, the intensity module 260 may obtain intensity values during a depth frame for one pixel in a group, a subset of the pixels in the group, for all pixels in the group, or some combination thereof.

The controller 230 comprises a calibration module 270 configured to calibrate the TDCs. The oscillator for reach TDC is configured to oscillate at a constant speed. However, over time, in response to temperature changes, oscillation speeds of one or more oscillators may start to vary. The calibration module 270 is configured to calibrate the current oscillation speed of the oscillators in order to calibrate the TOF measurements for the pixels on the sensor 220. During a calibration subframe, the calibration module 270 instructs the sensor to activate the oscillator input to one or more multiplexers. In some embodiments, in one image frame the calibration module 270 may calibrate all TDCs, the TDCs for a subset of pixel groups on the sensor 220, a subset of TDCs within a pixel group, or some combination. In some embodiments, the calibration module 270 may calibrate TDCs in a subset of image frames. For example, the calibration module 270 may perform calibrations in 10% of image frames. The calibration module 270 may comprise a clock which provides signals at known times. The clock may provide a first signal that starts the oscillator. The clock may provide a second signal that stops the oscillator. Between the first signal and the second signal, the oscillator increments the counter of the TDC. The length of time between the first signal and the second signal is known by the calibration module 270. The calibration module 270 reads the counter value. The calibration module 270 determines the oscillation speed of the oscillator based on the counter value and the length of time between signals. The controller 230 may use the measured oscillation speeds when calculating distances based on measurements by the depth determination module 250.

The calibration module 270 may calibrate a subset of the TDCs on the sensor 220 during a depth frame. For example, the calibration module 270 may calibrate 1%, 10%, 100%, or any other suitable portion of TDCs during a depth frame. Calibrating the TDCs consumes power. In order to optimize power consumption, the calibration module 270 may modify the calibration frequency based on environmental conditions. For example, in constant temperatures, or in response to calibration measurements having small variations, the calibration module 270 may decrease the frequency of calibrations (e.g., by decreasing the percentage of TDCs calibrated during each depth frame).

The calibration module 270 may be configured to calibrate the sensor 220 using the intensity values obtained by the intensity module 260. When obtained without projecting light into the local area, the obtained intensity values may represent ambient radiation that is independent from the light projected from the light projector 210. The obtained intensity values may be used to calibrate the sensor 220 by calibrating ambient light measurements out of the depth measurements. When the intensity values are obtained while projecting light into the local area, the intensity values may be used to determine the reflectivity of objects in the local area. The reflectivity determinations may be used to modify the amount of light projected into portions of the local area for depth determinations. For example, in portions of the field of view having objects of high reflectivity, the intensity of projected light for TOF measurements may be decreased to decrease battery loads. By estimating the target reflectivity via the intensity mode, the depth reconstruction can be calibrated against early detections or high intensity returning signal. Also, the target reflectivity may be used in guided neural networks to improve depth quality from intensity and depth measurements.

Figure 3:
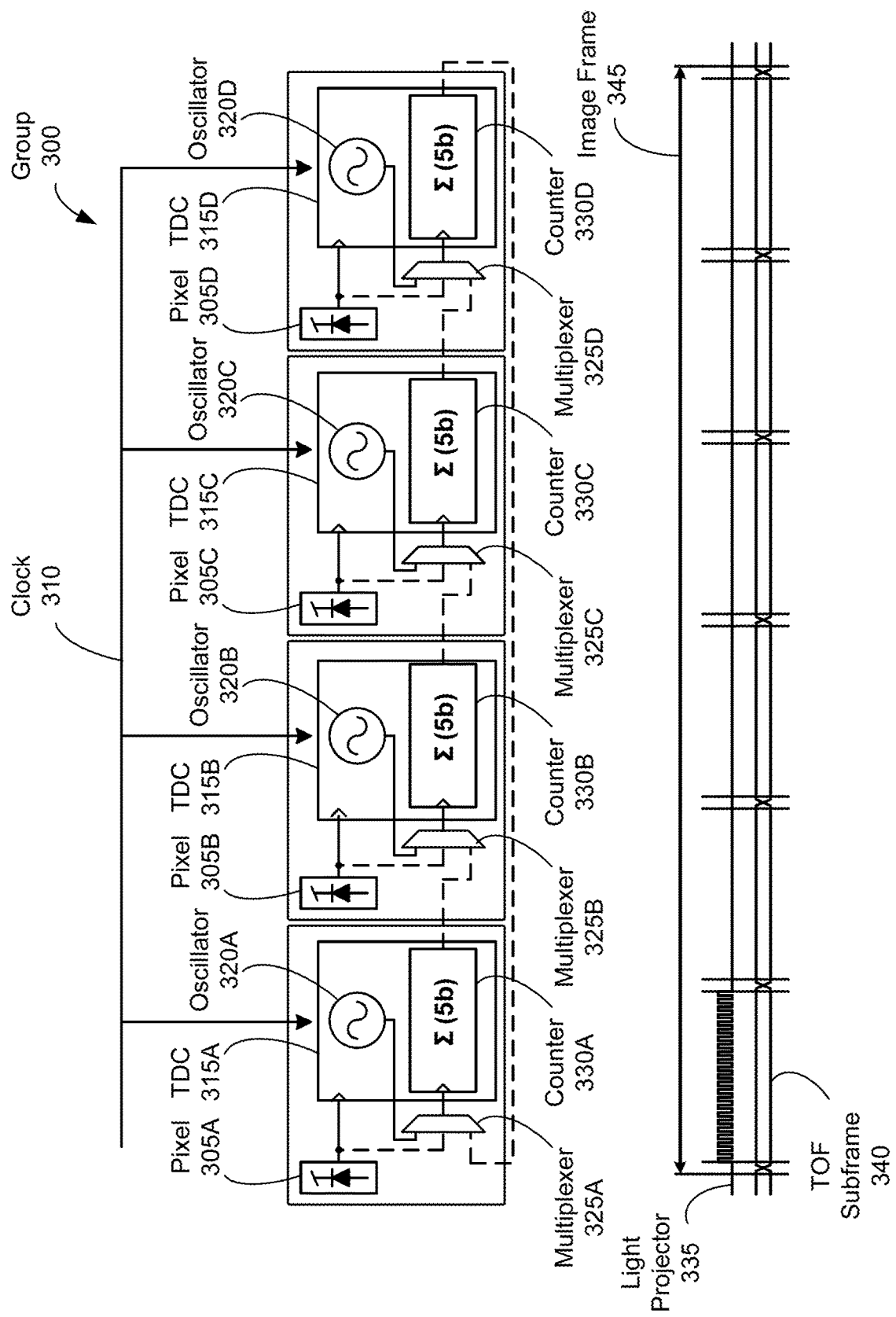
FIG. 3 is a schematic diagram of a group of pixels during a TOF subframe, in accordance with one or more embodiments.

FIG. 3 is a schematic diagram of a group 300 of pixels during a TOF subframe 340 of an image frame 345, in accordance with one or more embodiments. The group 300 of pixels is an embodiment of the groups of pixels described with respect to FIG. 2. During the TOF subframe 340, the group 300 is configured to obtain raw depth values. The group 300 comprises a first pixel 305A, a second pixel 305B, a third pixel 305C, and a fourth pixel 305D. During the TOF subframe 340, a light projector emits light pulses into a local area. Concurrently with each light pulse, a clock 310 transmits a signal to a TDC 315A, 315B, 315C, 315D for each pixel 305A, 305B, 305C, 305D. The signal starts the oscillators 320A, 320B, 320C, 320D for each TDC 315A, 315B, 315C, 315D. The multiplexers 325A, 325B, 325C, 325D receive the input from the oscillators 320A, 320B, 320C, 320D and output the signal to the counters 330A, 330B, 330C, 330D, which increments the counters 330A, 330B, 330C, 330D. In a start-stop scheme, each photon detected by a pixel causes the pixel to transmit a signal to its respective oscillator, which stops the oscillator and also stops the respective counter. The values of the counters are read out to a controller, which use the values to calculate distances to objects in the local area. The distances may be calculated based on a ratio of charge collected by a pixel during different time frames. Alternatively, operating in a reverse start-stop scheme, each photon detected starts the TDC and a signal from the clock 310 stops the counters. The time of flight is calculated using the known offset between the laser trigger and the stop clock.

Figure 4:
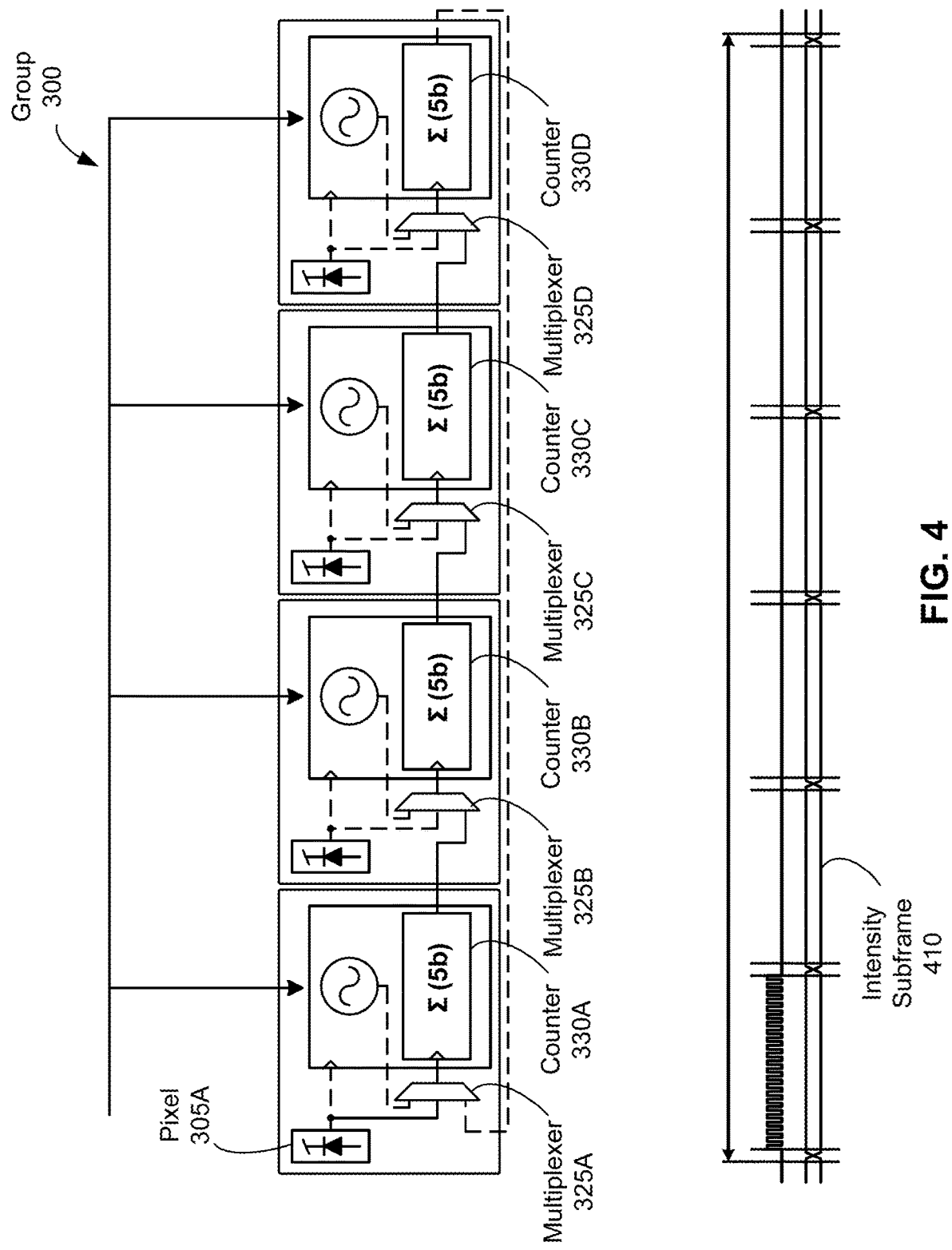
FIG. 4 is a schematic diagram of the group of pixels of FIG. 3 during an intensity subframe for a first pixel, in accordance with one or more embodiments.

FIG. 4 illustrates the group 300 of pixels during an intensity subframe 410 for the pixel 305A. During the intensity subframe 410, the group 300 of pixels is configured to measure an intensity of the pixel 305A. The multiplexer 325A is configured to select the multiplexer input coupled to the pixel 305A. The multiplexer 325B is configured to select the multiplexer input coupled to an output of the counter 330A. The multiplexer 325C is configured to select the multiplexer input coupled to an output of the counter 330B. The multiplexer 325D is configured to select the multiplexer input coupled to an output of the counter 330C. In response to the pixel 305A detecting a photon, the pixel 305A transmits a signal that increments the counter 330A. As illustrated, each counter 330A, 330B, 330C, 330D comprises five bits and can count from 00000 through 11111 (0-31). In response to the counter 330A reaching its maximum count, the next signal causes the counter 330A to reset and increment the counter 330B. Similarly, upon reaching its maximum count, the next signal causes the counter 330B to reset and increment the counter 330C, etc. Thus, the four counters 330A, 330B, 330C, 330D together form a twenty bit counter. The combined count from the four counters 330A, 330B, 330C, 330D may be read out at the end of the intensity subframe 410 to provide an intensity value for the pixel 305A.

Figure 5:
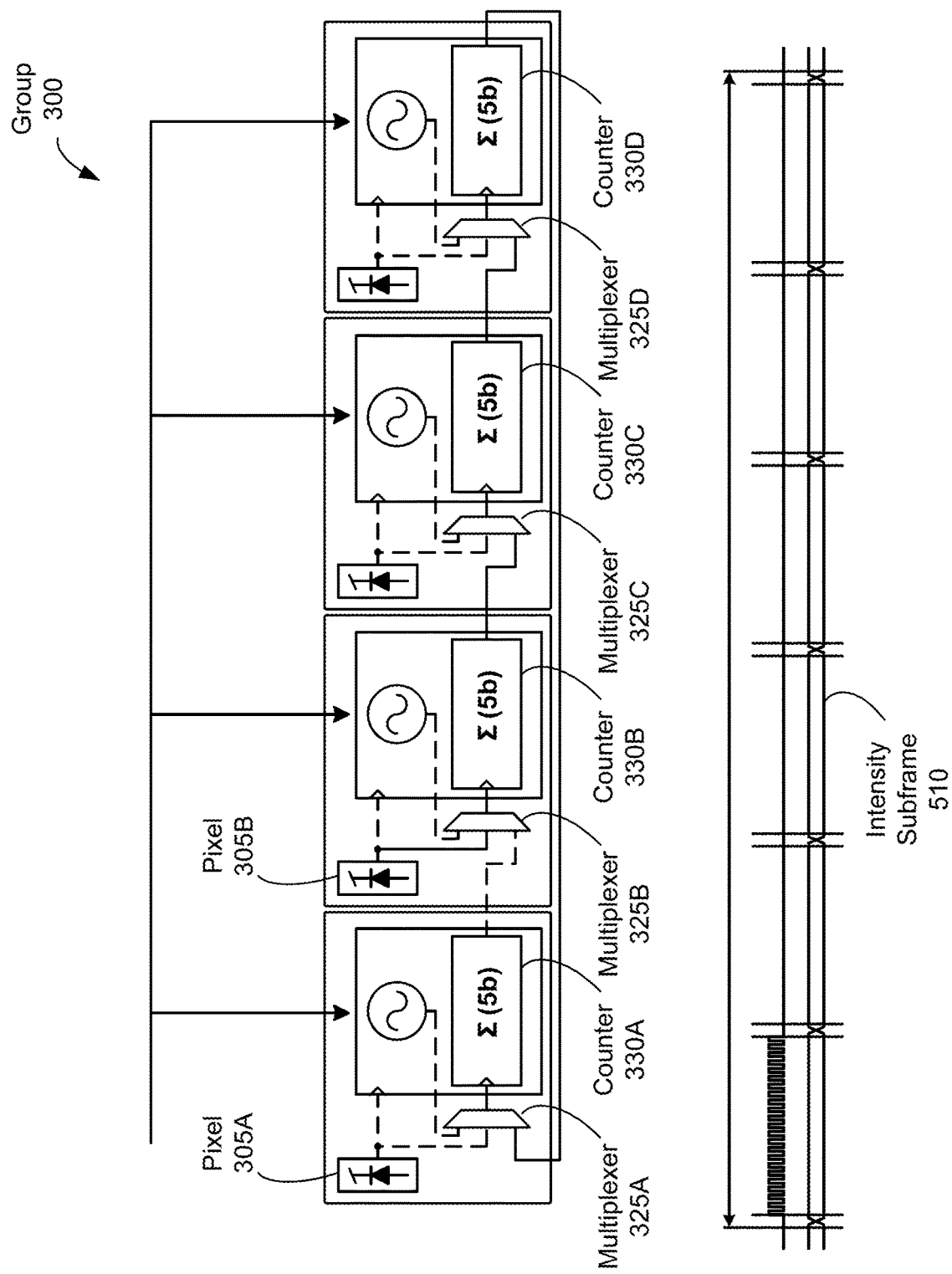
FIG. 5 is a schematic diagram of the group of pixels of FIG. 3 during an intensity subframe for a second pixel, in accordance with one or more embodiments.

FIG. 5 illustrates the group 300 of pixels during an intensity subframe 510 for the pixel 305B. During the intensity subframe 510, the group 300 of pixels is configured to measure an intensity of the pixel 305B. The multiplexer 325B is configured to select the multiplexer input coupled to the pixel 305B. The multiplexer 325C is configured to select the multiplexer input coupled to an output of the counter 330B. The multiplexer 325D is configured to select the multiplexer input coupled to an output of the counter 330C. The multiplexer 325A is configured to select the multiplexer input coupled to an output of the counter 330D. In response to the pixel 305B detecting a photon, the pixel 305B transmits a signal that increments the counter 330B. In response to the counter 330B reaching its maximum count, the next signal causes the counter 330B to reset and increment the counter 330C. Similarly, upon reaching its maximum count, the next signal causes the counter 330C to reset and increment the counter 330D, etc. Thus, the four counters 330A, 330B, 330C, 330D together form a twenty bit counter. The combined count from the four counters 330A, 330B, 330C, 330D may be read out at the end of the intensity subframe 510 to provide an intensity value for the pixel 305B.

Figure 6:
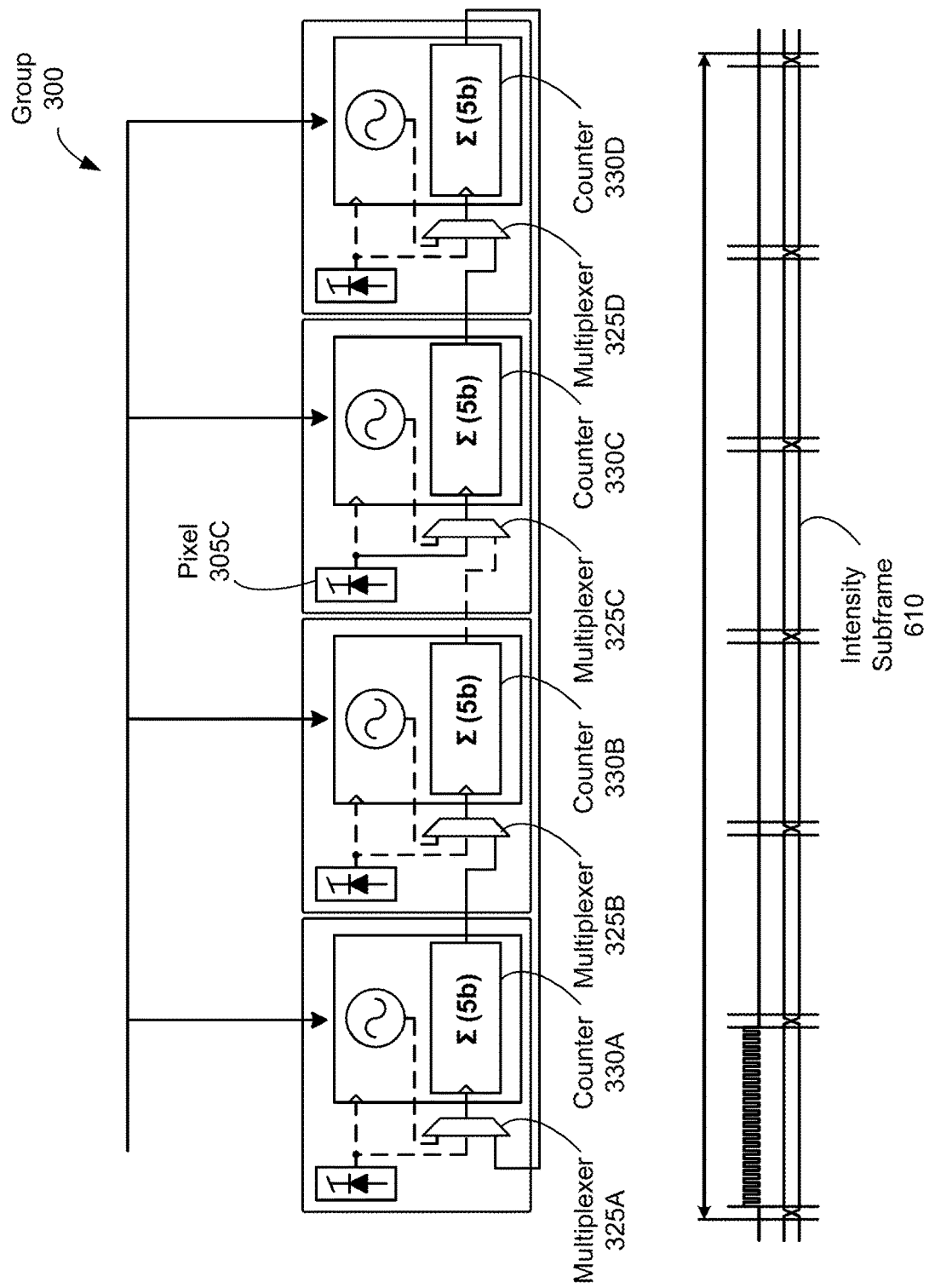
FIG. 6 is a schematic diagram of the group of pixels of FIG. 3 during an intensity subframe for a third pixel, in accordance with one or more embodiments.

FIG. 6 illustrates the group 300 of pixels during an intensity subframe 610 for the pixel 305C. During the intensity subframe 610, the group 300 of pixels is configured to measure an intensity of the pixel 305C. The multiplexer 325C is configured to select the multiplexer input coupled to the pixel 305C. The multiplexer 325D is configured to select the multiplexer input coupled to an output of the counter 330C. The multiplexer 325A is configured to select the multiplexer input coupled to an output of the counter 330D. The multiplexer 325B is configured to select the multiplexer input coupled to an output of the counter 330A. In response to the pixel 305C detecting a photon, the pixel 305C transmits a signal that increments the counter 330C. In response to the counter 330C reaching its maximum count, the next signal causes the counter 330C to reset and increment the counter 330D. Similarly, upon reaching its maximum count, the next signal causes the counter 330D to reset and increment the counter 330A, etc. Thus, the four counters 330A, 330B, 330C, 330D together form a twenty bit counter. The combined count from the four counters 330A, 330B, 330C, 330D may be read out at the end of the intensity subframe 610 to provide an intensity value for the pixel 305C.

Figure 7:
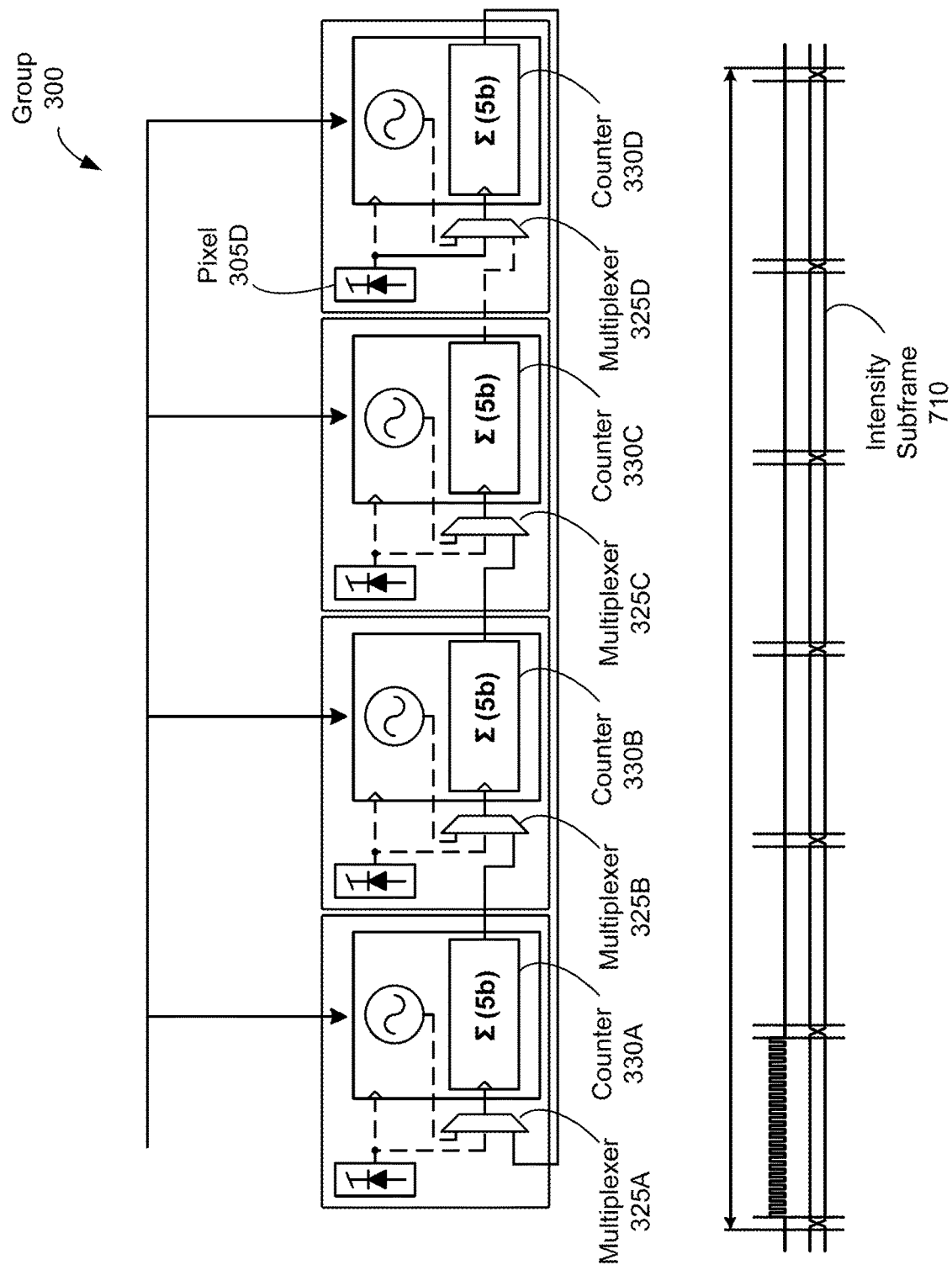
FIG. 7 is a schematic diagram of the group of pixels of FIG. 3 during an intensity subframe for a fourth pixel, in accordance with one or more embodiments.

FIG. 7 illustrates the group 300 of pixels during an intensity subframe 710 for the pixel 305D. During the intensity subframe 710, the group 300 of pixels is configured to measure an intensity of the pixel 305D. The multiplexer 325D is configured to select the multiplexer input coupled to the pixel 305D. The multiplexer 325A is configured to select the multiplexer input coupled to an output of the counter 330D. The multiplexer 325B is configured to select the multiplexer input coupled to an output of the counter 330A. The multiplexer 325C is configured to select the multiplexer input coupled to an output of the counter 330B. In response to the pixel 305D detecting a photon, the pixel 305D transmits a signal that increments the counter 330D. In response to the counter 330D reaching its maximum count, the next signal causes the counter 330D to reset and increment the counter 330A. Similarly, upon reaching its maximum count, the next signal causes the counter 330A to reset and increment the counter 330B, etc. Thus, the four counters 330A, 330B, 330C, 330D together form a twenty bit counter. The combined count from the four counters 330A, 330B, 330C, 330D may be read out at the end of the intensity subframe 710 to provide an intensity value for the pixel 305D.

The ability to reconfigure the group 300 of pixels provides several advantages. For example, the sensor is able to capture both intensity and depth information using a single sensor without any alignment complications due to different sensors being located in different locations. Additionally, the intensity information is captured during portions of a frame during which the pixels may be idle otherwise. Furthermore, coupling the counters 330A, 330B, 330C, 330D together provides a twenty bit counter for intensity counts, as opposed to a five bit counter if used independently.

Figure 8:
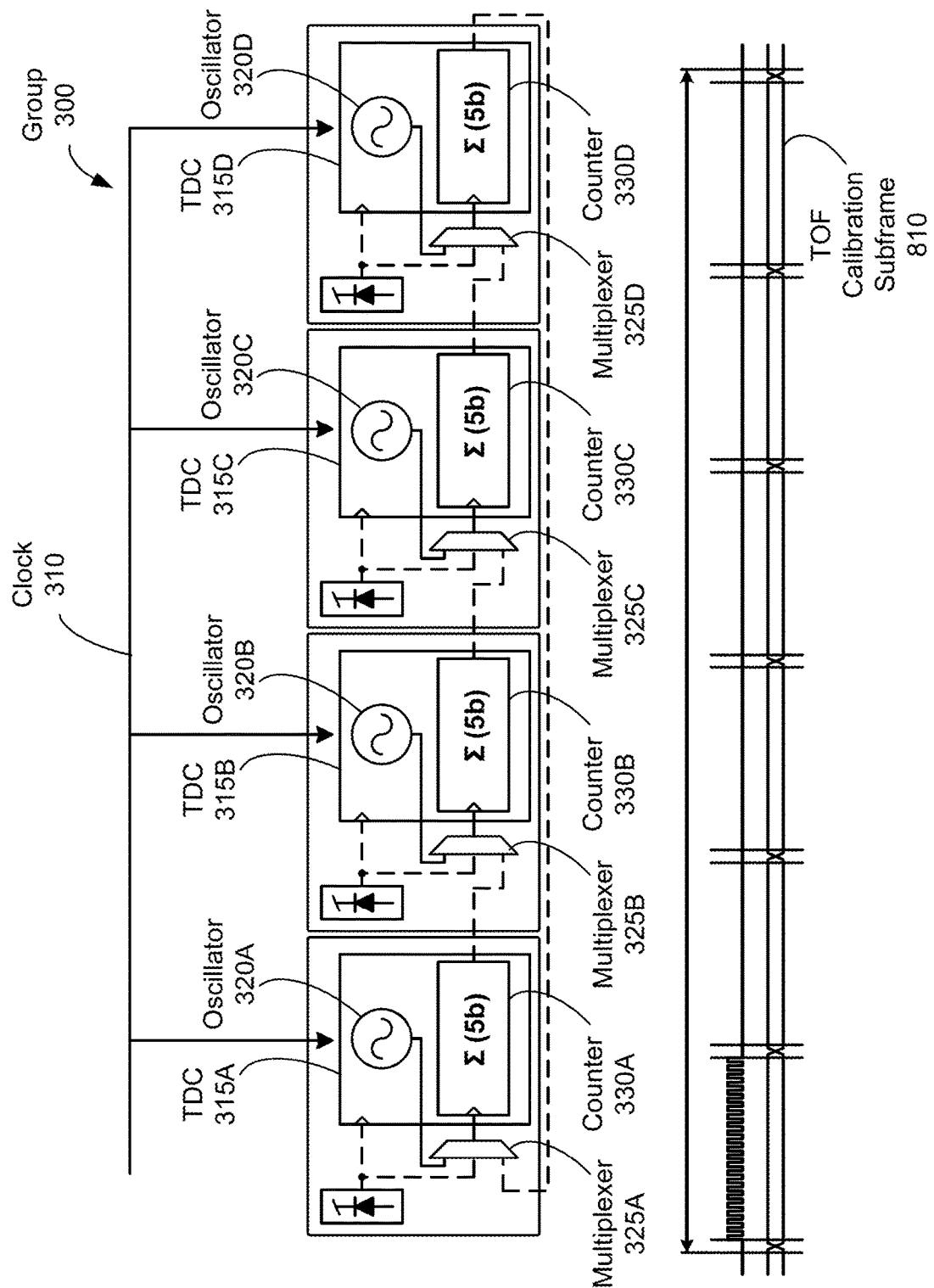
FIG. 8 is a schematic diagram of the group of pixels of FIG. 3 during a TOF calibration subframe, in accordance with one or more embodiments.

FIG. 8 illustrates the group 300 of pixels during a TOF calibration subframe 810, in accordance with one or more embodiments. During the TOF calibration subframe, the controller is configured to calculate the oscillation speed of one or more of the oscillators 320A, 320B, 320C, 320D in each TDC 315A, 315B, 315C, 315D. The multiplexers 325A, 325B, 325C, 325D are configured to select the multiplexer input coupled to their respective oscillator 320A, 320B, 320C, 320D. An external clock 310 is configured to provide a start pulse and an end pulse. The duration between the start pulse and the end pulse is a known duration. Between the start pulse and the stop pulse, the oscillators 320A, 320B, 320C, 320D increment their respective counters 330A, 330B, 330C, 330D. The counter values may be read out to a controller (e.g., the controller 230), and the controller may divide the counter values by the known duration to obtain the oscillation speed of each oscillator 320A, 320B, 320C, 320D. The oscillation speeds may be used to calculate depth information for TOF measurements obtained during the depth frame and for subsequent TOF measurements. The TOF measurements, the intensity measurements, and the calibrations may be performed in any order within a subframe.

FIG. 9 is a flowchart of a method 900 of calibrating a sensor, in accordance with one or more embodiments. The process shown in FIG. 9 may be performed by components of a depth camera assembly (e.g., depth camera assembly 200). Other entities may perform some or all of the steps in FIG. 9 in other embodiments. Embodiments may include different and/or additional steps or perform the steps in different orders.

During a first portion of an image frame, a controller estimates 910 raw depth values associated with light collected by each pixel of a group of pixels in a sensor for a depth camera assembly. The raw depth value for each pixel may be calculated based on a value obtained from a TDC comprising a counter coupled to an oscillator. A multiplexer for each pixel is configured to select a multiplexer input coupled to the oscillator and output the signal to the counter. In some embodiments, the controller may operate in a start-stop scheme or a reverse start-stop scheme. The oscillator may increment the counter between the time that a pulse is emitted by a light projector and the time that the pixel transmits a signal to the oscillator in response to detected photons.

During a second portion of the image frame, the controller performs 920 an intensity measurement for one or more pixels in the group of pixels. The controller may perform, in series, intensity measurements for some or all pixels in a group of pixels. The intensity measurement is based in part on information received from the plurality of counters. The plurality of counters are coupled together via multiplexers to effectively form a single combined counter including the bits from each individual counter.

The controller may perform an intensity measurement for different pixels during different intensity subframes during the second portion of the image frame. For example, during an intensity subframe for a first pixel, the controller may perform an intensity measurement for a first pixel in the group of pixels. The combined counter is configured to increment each time the first pixel detects a photon. For example, for a group of pixels having N pixels, during the intensity subframe for the first pixel, the counter for the first pixel receives input from the first pixel, the counter for the second pixel receives input from the counter for the first pixel, the counter for the third pixel receives input from the counter for the second pixel . . . and the counter for the Nth pixel receives input from the counter for the N−1 pixel.

During an intensity subframe for a second pixel in the group of pixels, the controller may perform an intensity measurement for the second pixel. During the intensity subframe for the second pixel, the combined counter is configured to increment each time the second pixel detects a photon. The controller may perform intensity measurements for additional pixels in the group of pixels during additional subframes of the image frame. For example, for a group of pixels comprising N pixels, the controller may perform between zero to N intensity measurements in series.

During a third portion of the image frame, the controller calibrates 930 one or more TDCs of the sensor. The speed of each oscillator may be measured by counting the number of oscillations during a known time duration. The known time duration may be provided by a clock which emits start and stop pulses to the TDC at known times. The speed of each oscillator may be used to calculate depth information for each pixel in the group of pixels.

The controller may calibrate 940 the raw depth values for the image frame using the intensity measurements. The intensity measurements may represent ambient radiation, which may be used to calibrate the sensor. The intensity measurements may be used to calibrate the sensor by calibrating ambient light measurements out of the depth measurements. When the intensity values are obtained while projecting light into the local area, the intensity values may be used to determine the reflectivity of objects in the local area. The reflectivity determinations may be used to modify the amount of light projected into portions of the local area for depth determinations. The reflectivity determinations may also be used to compensate for distortions produced by high intensity returning signal levels.

Figure 10:
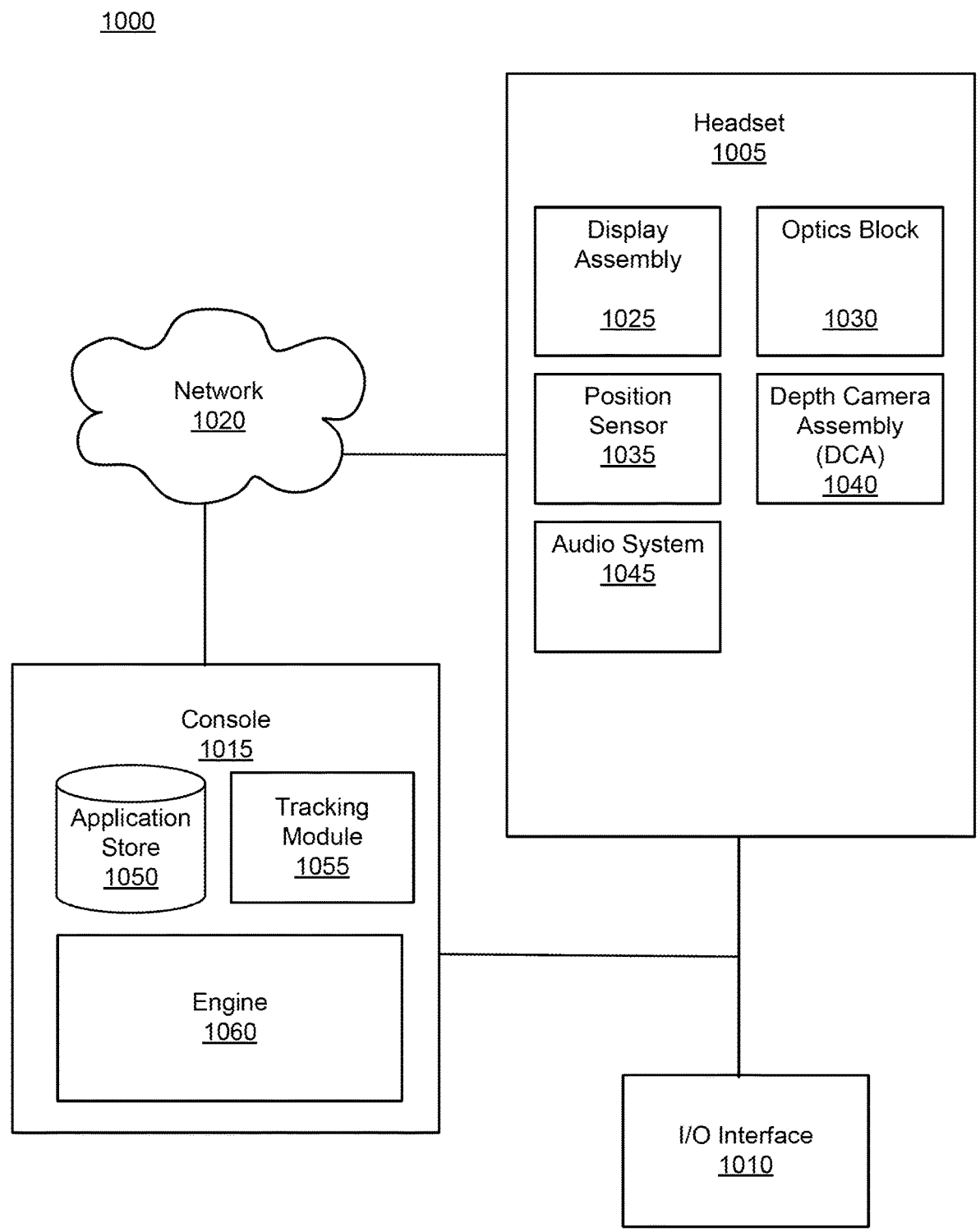
FIG. 10 is a system that includes a headset with a depth camera assembly including multi-purpose time-to-digital converters, in accordance with one or more embodiments.

FIG. 10 is a system 1000 that includes a headset 1005, in accordance with one or more embodiments. In some embodiments, the headset 1005 may be the headset 100 of FIG. 1A or the headset 105 of FIG. 1B. The system 1000 may operate in an artificial reality environment (e.g., a virtual reality environment, an augmented reality environment, a mixed reality environment, or some combination thereof). The system 1000 shown by FIG. 10 includes the headset 1005, an input/output (I/O) interface 1010 that is coupled to a console 1015, and the network 1020. While FIG. 10 shows an example system 1000 including one headset 1005 and one I/O interface 1010, in other embodiments any number of these components may be included in the system 1000. For example, there may be multiple headsets each having an associated I/O interface 1010, with each headset and I/O interface 1010 communicating with the console 1015. In alternative configurations, different and/or additional components may be included in the system 1000. Additionally, functionality described in conjunction with one or more of the components shown in FIG. 10 may be distributed among the components in a different manner than described in conjunction with FIG. 10 in some embodiments. For example, some or all of the functionality of the console 1015 may be provided by the headset 1005.

The headset 1005 includes the display assembly 1025, an optics block 1030, one or more position sensors 1035, the DCA 1040, and the audio system 1045. Some embodiments of headset 1005 have different components than those described in conjunction with FIG. 10. Additionally, the functionality provided by various components described in conjunction with FIG. 10 may be differently distributed among the components of the headset 1005 in other embodiments or be captured in separate assemblies remote from the headset 1005.

The display assembly 1025 displays content to the user in accordance with data received from the console 1015. The display assembly 1025 displays the content using one or more display elements (e.g., the display elements 120). A display element may be, e.g., an electronic display. In various embodiments, the display assembly 1025 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 1030.

The optics block 1030 may magnify image light received from the electronic display, corrects optical errors associated with the image light, and presents the corrected image light to one or both eyeboxes of the headset 1005. In various embodiments, the optics block 1030 includes one or more optical elements. Example optical elements included in the optics block 1030 include: an aperture, a Fresnel lens, a convex lens, a concave lens, a filter, a reflecting surface, or any other suitable optical element that affects image light. Moreover, the optics block 1030 may include combinations of different optical elements. In some embodiments, one or more of the optical elements in the optics block 1030 may have one or more coatings, such as partially reflective or anti-reflective coatings.

Magnification and focusing of the image light by the optics block 1030 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 1030 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 1030 corrects the distortion when it receives image light from the electronic display generated based on the content.

The position sensor 1035 is an electronic device that generates data indicating a position of the headset 1005. The position sensor 1035 generates one or more measurement signals in response to motion of the headset 1005. The position sensor 190 is an embodiment of the position sensor 1035. Examples of a position sensor 1035 include: one or more IMUs, one or more accelerometers, one or more gyroscopes, one or more magnetometers, another suitable type of sensor that detects motion, or some combination thereof. The position sensor 1035 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 1005 from the sampled data. For example, the IMU integrates the measurement signals received from the accelerometers over time to estimate a velocity vector and integrates the velocity vector over time to determine an estimated position of a reference point on the headset 1005. The reference point is a point that may be used to describe the position of the headset 1005. While the reference point may generally be defined as a point in space, however, in practice the reference point is defined as a point within the headset 1005.

The DCA 1040 generates depth information for a portion of the local area. The DCA 1040 is an embodiment of the DCA 200 of FIG. 2. The DCA 1040 includes one or more imaging devices and a DCA controller. The DCA 1040 also includes a light projector. The DCA 1040 comprises a sensor including groups of pixels. Each group of pixels comprises multi-purpose TDCs. During a first portion of an image frame, the DCA 1040 is configured to obtain TOF information. During a second portion of the image frame, the DCA 1040 is configured to obtain intensity information. During a third portion of the image frame, the DCA 1040 is configured to calibrate the sensor. Operation and structure of the DCA 1040 is described above with regard to FIG. 2.

The audio system 1045 provides audio content to a user of the headset 1005. The audio system 1045 may comprise one or acoustic sensors, one or more transducers, and an audio controller. The audio system 1045 may provide spatialized audio content to the user. In some embodiments, the audio system 1045 may receive acoustic parameters from a mapping server over the network 1020. The acoustic parameters describe one or more acoustic properties (e.g., room impulse response, a reverberation time, a reverberation level, etc.) of the local area. The audio system 1045 may receive information describing at least a portion of the local area from e.g., the DCA 1040 and/or location information for the headset 1005 from the position sensor 1035. The audio system 1045 may generate one or more sound filters using one or more of the acoustic parameters and use the sound filters to provide audio content to the user.

The I/O interface 1010 is a device that allows a user to send action requests and receive responses from the console 1015. An action request is a request to perform a particular action. For example, an action request may be an instruction to start or end capture of image or video data, or an instruction to perform a particular action within an application. The I/O interface 1010 may include one or more input devices. Example input devices include: a keyboard, a mouse, a game controller, or any other suitable device for receiving action requests and communicating the action requests to the console 1015. An action request received by the I/O interface 1010 is communicated to the console 1015, which performs an action corresponding to the action request. In some embodiments, the I/O interface 1010 includes an IMU that captures calibration data indicating an estimated position of the I/O interface 1010 relative to an initial position of the I/O interface 1010. In some embodiments, the I/O interface 1010 may provide haptic feedback to the user in accordance with instructions received from the console 1015. For example, haptic feedback is provided when an action request is received, or the console 1015 communicates instructions to the I/O interface 1010 causing the I/O interface 1010 to generate haptic feedback when the console 1015 performs an action.

The console 1015 provides content to the headset 1005 for processing in accordance with information received from one or more of: the DCA 1040, the headset 1005, and the I/O interface 1010. In the example shown in FIG. 10, the console 1015 includes an application store 1050, a tracking module 1055, and an engine 1060. Some embodiments of the console 1015 have different modules or components than those described in conjunction with FIG. 10. Similarly, the functions further described below may be distributed among components of the console 1015 in a different manner than described in conjunction with FIG. 10. In some embodiments, the functionality discussed herein with respect to the console 1015 may be implemented in the headset 1005, or a remote system.

The application store 1050 stores one or more applications for execution by the console 1015. An application is a group of instructions, that when executed by a processor, generates content for presentation to the user. Content generated by an application may be in response to inputs received from the user via movement of the headset 1005 or the I/O interface 1010. Examples of applications include: gaming applications, conferencing applications, video playback applications, or other suitable applications.

The tracking module 1055 tracks movements of the headset 1005 or of the I/O interface 1010 using information from the DCA 1040, the one or more position sensors 1040, or some combination thereof. For example, the tracking module 1055 determines a position of a reference point of the headset 1005 in a mapping of a local area based on information from the headset 1005. The tracking module 1055 may also determine positions of an object or virtual object. Additionally, in some embodiments, the tracking module 1055 may use portions of data indicating a position of the headset 1005 from the position sensor 1035 as well as representations of the local area from the DCA 1040 to predict a future location of the headset 1005. The tracking module 1055 provides the estimated or predicted future position of the headset 1005 or the I/O interface 1010 to the engine 1060.

The engine 1060 executes applications and receives position information, acceleration information, velocity information, predicted future positions, or some combination thereof, of the headset 1005 from the tracking module 1055. Based on the received information, the engine 1060 determines content to provide to the headset 1005 for presentation to the user. For example, if the received information indicates that the user has looked to the left, the engine 1060 generates content for the headset 1005 that mirrors the user's movement in a virtual local area or in a local area augmenting the local area with additional content. Additionally, the engine 1060 performs an action within an application executing on the console 1015 in response to an action request received from the I/O interface 1010 and provides feedback to the user that the action was performed. The provided feedback may be visual or audible feedback via the headset 1005 or haptic feedback via the I/O interface 1010.

The network 1020 may couple the headset 1005 or the console 1015 to various external systems. The network 1020 may include any combination of local area and/or wide area networks using both wireless and/or wired communication systems. For example, the network 1020 may include the Internet, as well as mobile telephone networks. In one embodiment, the network 1020 uses standard communications technologies and/or protocols. Hence, the network 1020 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 1020 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1020 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

One or more components of system 1000 may contain a privacy module that stores one or more privacy settings for user data elements. The user data elements describe the user or the headset 1005. For example, the user data elements may describe a physical characteristic of the user, an action performed by the user, a location of the user of the headset 1005, a location of the headset 1005, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 1000 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A depth camera assembly (DCA) comprising:
a sensor comprising a plurality of pixels configured to capture images of a local area, the plurality of pixels comprising a group of pixels;
a plurality of counters that are coupled to each other, wherein each of the plurality of counters is coupled to a corresponding pixel of the group of pixels; and
a controller configured to:
estimate, during a first portion of an image frame, raw depth values associated with light collected by each pixel of the group of pixels; and
perform, during a second portion of the image frame, an intensity measurement for a first pixel in the group of pixels, wherein the intensity measurement is based in part on information received from the plurality of counters during the second portion of the image frame.

2. The depth camera assembly of claim 1, wherein the controller is further configured to calibrate the raw depth values for the image frame using the intensity measurement.

3. The depth camera assembly of claim 1, wherein the controller is further configured to perform, during the second portion of the image frame, an intensity measurement for a second pixel in the group of pixels, wherein the intensity measurement for the second pixel is based in part on information received from the plurality of counters during the second portion of the image frame.

4. The depth camera assembly of claim 1, wherein the sensor comprises a plurality of time-to-digital converters, wherein each of the plurality of time-to-digital converters is coupled to a respective pixel of the group of pixels.

5. The depth camera assembly of claim 4, wherein the controller is further configured to calibrate, during a third portion of the image frame, one or more of the time-to-digital converters.

6. The depth camera assembly of claim 1, wherein the raw depth values comprise time of flight measurements.

7. The depth camera assembly of claim 1, wherein:
during the first portion of the image frame, a multiplexer is configured to select a multiplexer input coupled to an oscillator; and
during the second portion of the image frame, the multiplexer is configured to select a multiplexer input coupled to the first pixel.

8. A method comprising:
estimating, during a first portion of an image frame for a depth camera assembly comprising a sensor, raw depth values associated with light collected by each pixel of a group of pixels on the sensor; and
performing, during a second portion of the image frame, an intensity measurement for a first pixel in the group of pixels, wherein the intensity measurement is based in part on information received from a plurality of counters during the second portion of the image frame, wherein each of the plurality of counters is coupled to a corresponding pixel of the group of pixels.

9. The method of claim 8, further comprising calibrating the raw depth values for the image frame using the intensity measurement.

10. The method of claim 8, further comprising performing, during the second portion of the image frame, an intensity measurement for a second pixel in the group of pixels, wherein the intensity measurement for the second pixel is based in part on information received from the plurality of counters during the second portion of the image frame.

11. The method of claim 8, wherein the sensor comprises a plurality of time-to-digital converters, wherein each of the plurality of time-to-digital converters is coupled to a respective pixel of the group of pixels.

12. The method of claim 11, further comprising calibrating, during a third portion of the image frame, one or more of the time-to-digital converters.

13. The method of claim 8, wherein the raw depth values comprise time of flight measurements.

14. The method of claim 8, further comprising:
selecting, by a multiplexer during the first portion of the image frame, a multiplexer input coupled to an oscillator; and
selecting, by the multiplexer during the second portion of the image frame, a multiplexer input coupled to the first pixel.

15. A depth camera assembly (DCA) comprising:
a first pixel;
a first time-to-digital converter coupled to the first pixel, the first time-to-digital converter comprising a first oscillator and a first counter;
a first multiplexer comprising:
a multiplexer input coupled to the first pixel;
a multiplexer input coupled to the first oscillator; and
a multiplexer output coupled to the first counter;
a second pixel;
a second time-to-digital converter coupled to the second pixel, the second time-to-digital converter comprising a second oscillator and a second counter; and
a second multiplexer comprising:
a multiplexer input coupled to the second pixel;
a multiplexer input coupled to the second oscillator;
a multiplexer input coupled to the first counter; and
a multiplexer output coupled to the second counter.

16. The depth camera assembly of claim 15, further comprising a controller configured to:
estimate, during a first portion of an image frame, raw depth values associated with light collected by each pixel of a group of pixels comprising the first pixel and the second pixel; and
perform, during a second portion of the image frame, an intensity measurement for the first pixel, wherein the intensity measurement is based in part on information received from the first counter and the second counter during the second portion of the image frame.

17. The depth camera assembly of claim 15, wherein:
during a time of flight portion of an image frame, the first multiplexer is configured to select the multiplexer input coupled to the first oscillator and the second multiplexer is configured to select the multiplexer input coupled to the second oscillator; and
during a first intensity portion of the image frame, the first multiplexer is configured to select the multiplexer input coupled to the first pixel and the second multiplexer is configured to select the multiplexer input coupled to the first counter.

18. The depth camera assembly of claim 17, wherein, during a second intensity portion of the image frame, the first multiplexer is configured to select a multiplexer input coupled to a third counter and the second multiplexer is configured to select the multiplexer input coupled to the second pixel.

19. The depth camera assembly of claim 15, further comprising a clock configured to provide, during a time of flight calibration portion of an image frame, a start signal and a stop signal to the first oscillator and the second oscillator at known times.

20. The depth camera assembly of claim 19, wherein, during the time of flight calibration portion of the image frame, the first multiplexer is configured to select the multiplexer input coupled to the first oscillator and the second multiplexer is configured to select the multiplexer input coupled to the second oscillator.

* * * * *